(12) United States Patent
Ozugur et al.

(10) Patent No.: US 11,947,450 B1
(45) Date of Patent: Apr. 2, 2024

(54) DETECTING AND MITIGATING APPLICATION SECURITY THREATS BASED ON QUANTITATIVE ANALYSIS

(71) Applicant: Bank of America Corporation, Charlotte, NC (US)

(72) Inventors: Timucin Ozugur, Fairview, TX (US); Mark Trenton Cimijotti, Monroe, NC (US)

(73) Assignee: Bank of America Corporation, Charlotte, NC (US)

( * ) Notice: Subject to any disclaimer, the term of this patent is extended or adjusted under 35 U.S.C. 154(b) by 76 days.

(21) Appl. No.: 17/932,792

(22) Filed: Sep. 16, 2022

(51) Int. Cl.
G06F 11/36 (2006.01)
G06F 8/60 (2018.01)
G06F 8/70 (2018.01)

(52) U.S. Cl.
CPC ............ *G06F 11/3692* (2013.01); *G06F 8/60* (2013.01); *G06F 8/70* (2013.01); *G06F 11/3608* (2013.01)

(58) Field of Classification Search
CPC .... G06F 11/3608; G06F 11/3692; G06F 8/60; G06F 8/70
See application file for complete search history.

(56) References Cited

U.S. PATENT DOCUMENTS

| | | | |
|---|---|---|---|
| 7,832,007 B2 | 11/2010 | Riabov et al. | |
| 10,025,929 B2 | 7/2018 | Sethumadhavan et al. | |
| 10,534,701 B1 | 1/2020 | Pande et al. | |
| 10,560,306 B2 | 2/2020 | Van Wie et al. | |
| 10,560,468 B2 | 2/2020 | Muddu et al. | |
| 10,592,676 B2 | 3/2020 | Sawhney et al. | |
| 10,592,938 B2 | 3/2020 | Hogg et al. | |
| 10,728,364 B1 | 7/2020 | Licata et al. | |
| 10,826,928 B2 | 11/2020 | Carey et al. | |
| 11,044,267 B2 | 6/2021 | Jakobsson et al. | |
| 11,055,199 B2 | 7/2021 | Natari | |
| 11,157,997 B2 | 10/2021 | Robida et al. | |
| 11,354,104 B2 | 6/2022 | Licata et al. | |

(Continued)

OTHER PUBLICATIONS

Wenjun Xiong et al., "Threat modeling—A systematic literature review," 2019 [retrieved on Jan. 9, 2024], Computers & Security vol. 84, pp. 53-69, downloaded from <url>:https://www.sciencedirect.com. (Year: 2019).*

*Primary Examiner* — S. Sough
*Assistant Examiner* — Stephen D Berman

(57) ABSTRACT

A system for detecting and mitigating application security threats comprises a processor associated with a server. The processor analyzes a group of code sets of an application and determines a number of the threat objects in each code set. The processor further executes a run-time security model to analyze a combined code sets to determine threat object measurements and false positive measurements of application product releases for the application. The processor determines threat threshold ratios and false positive ratios per application. The processor further generates an array of quartile weights corresponding to a set of quartile ranges of the threat threshold ratios and a set of quartile ranges of the false positive ratios associated with the application. The processor generates an adjusted object measurement for the application based on a corresponding quartile weight in the array. The processor determines whether to trigger a development security model for the application.

20 Claims, 4 Drawing Sheets

(56) References Cited

U.S. PATENT DOCUMENTS

| | | |
|---|---|---|
| 2016/0308898 A1 | 10/2016 | Teeple et al. |
| 2020/0118692 A1 | 4/2020 | Booker et al. |
| 2020/0387357 A1 | 12/2020 | Mathon et al. |
| 2021/0160266 A1* | 5/2021 | Sternby .................. H04L 41/16 |
| 2022/0035927 A1* | 2/2022 | Lysecky ................ G06F 21/566 |
| 2022/0094705 A1* | 3/2022 | Tineo ..................... H04L 63/20 |
| 2023/0176562 A1* | 6/2023 | Eichler .............. G05B 23/0235 |
| | | 700/80 |

* cited by examiner

DETECTING AND MITIGATING APPLICATION SECURITY THREATS BASED ON QUANTITATIVE ANALYSIS

TECHNICAL FIELD

The present disclosure relates generally to software engineering and security control, and more specifically to a system and method for detecting and mitigating application security threats based on quantitative analysis.

BACKGROUND

Changes to an application product may occur dynamically in a continuous integration/continuous deployment (CI/CD) pipeline process. Quality assurance assessment and analysis is important to facilitate and enhance the application product development from design, development, test through release and maintenance. Current information security control technologies are not configured to provide a reliable and efficient solution to preform security analysis and control on an application product.

SUMMARY

Conventional technology is not configured to provide a reliable and efficient solution to preform security analysis and control for detecting and mitigating application security threats associated with an application product (e.g., an application) in a continuous integration/continuous deployment (CI/CD) pipeline process. The system described in the present disclosure is particularly integrated into a practical application of detecting and mitigating application security threats.

In one embodiment, the system for detecting and mitigating application security threats based on quantitative analysis comprises a processor and a memory. The system comprises distinct security models executed respectively to perform corresponding security analysis of a group of development code sets associated with the application in the CI/CD pipeline process. The processor executes a static security model to analyze each of the group of the development code sets to detect a number of corresponding threat objects in each development code set. Each threat object represents an application security threat which may cause the functionality of development code sets of an application operating incorrectly. The processor determines whether the number of the threat objects detected in each development code set is lower than a static threat threshold. In response to determining that the number of the threat objects in each of the development code sets is lower than the static threat threshold, the processor combines the group of the development code sets to run the application. In response to determining that the number of the threat objects in a corresponding development code set is not lower than the static threat threshold, the processor reevaluates the corresponding development code set by executing the static security model. In response to running the application, the processor executes a run-time security model to analyze the combined development code sets to determine a set of threat object measurements and a set of false positive measurements. Each threat object measurement represents a number of threat objects detected in each application product release for the application. Each false positive measurement represents a number of threat objects detected in a corresponding application product release while the corresponding detected threat objects may be falsely detected. The processor determines a set of threat threshold ratios per application between each run-time threat threshold and a highest value of a set of run-time threat thresholds. The processor determines a set of false positive ratios per application between each false positive measurement and a highest value of the set of the false positive measurements. The processor generates an array of quartile weights corresponding to a set of quartile ranges of the threat threshold ratios and a set of quartile ranges of the false positive ratios associated with the application. The processor generates an adjusted object measurement of a plurality of application product releases for the application based on a corresponding quartile weight in the array. Based on the adjusted object measurement, the processor determines whether to trigger a development security model for the application.

In one embodiment, the processor ranks the set of threat threshold ratios to generate the set of quartile ranges of the threat threshold ratios. The processor ranks the set of false positive ratios to generate the set of the quartile ranges of the false positive ratios. The processor groups the development code sets based on the set of the quartile ranges of the threat threshold ratios and the set of quartile ranges of the false positive ratios. The processor determines the corresponding quartile weight in the array of the quartile weights corresponding to a quartile range of the threat threshold ratio and a quartile range of the false positive ratio associated with the application. A value of each quartile weight is configured to map to a quartile range of threshold ratios and a quartile range of the false positive ratios in an array of quartile weights. The processor generates a first adjusted threat object measurement by multiplying the corresponding quartile weight with a cumulative sum of the corresponding threat object measurements for the application product releases for the application. The processor determines whether the first adjusted threat object measurement is above a development threat threshold associated with the development security model. In response to determining that the first adjusted threat object measurement is above the development threat threshold, the processor dynamically triggers the development security model for the application to analyze the corresponding development code set.

In one embodiment, the system for detecting and mitigating application security threats based on threat change patterns comprises a processor and a memory. The processor executes a run-time security model to analyze the combined development code sets to determine a set of threat object measurements. Each threat object measurement represents a number of threat objects detected in each application product release for the application. The processor generates a set of threat change ratios per application based on the first threat object measurement and the threat object measurements after the first threat object measurement associated with the combined development code sets. The processor determines, based on one or more threat change patterns of the set of the threat change ratios, whether to trigger a development security model for the application. The disclosed system is related to an application product quality evaluation process that provides security objects detection and analysis of an application in the CI/CD pipeline process. The disclosed system provides a practical application by integrating different functional security models to detect and mitigate threat objects in the application at different development stages in the CI/CD pipeline process. For example, the disclosed system executes a run-time security model to perform dynamic analysis on the combined development code sets associated with the application to generate threat analysis results while the application is running. The disclosed system provides a practical application by preforming corresponding threat objects measurement analysis based on quantitative analysis. The quantitative analysis is associated with a quartile range of threshold ratios and a quartile range of the false positive ratios associated with the application. The disclosed system provides a practical application by utilizing quartile weights corresponding to a quartile range of threshold ratios and a quartile range of the false positive ratios associated with an application. The disclosed system generates an adjusted threat object measurement of a plurality of application product releases for the application. The server may dynamically determine a cumulative sum of the detected threat objects and the corresponding adjusted threat object measurement for the application. By analyzing the adjusted threat object measurements for the application, the disclosed system determines whether and when to trigger one or more development security models. The disclosed system provides a practical application to smooth the impact of the false positive ratios corresponding to the development code sets and improves the threat detection accuracy and efficiency. The server may generate a threat object report about the threat objects detected in the combined development code sets when the application product is running. The detected threat objects in the corresponding development code sets may be remediated in real-time. The disclosed system improves the application production quality assurance and increases an efficiency of the application product development in the CI/CD pipeline process.

Further, the disclosed system provides a practical application by preforming corresponding threat objects measurement analysis to determine threat change patterns. By analyzing the threat objects measurements and threat change patterns of the detected threat objects, the disclosed system provides a practical application to recommend whether and when to trigger a development security model for the application to mitigate threat objects and improve application product quality. The integrated threat analysis may be provided with static security analysis and run-time dynamic threat analysis to provide dynamitic solutions for different applications in real time. The disclosed system provides an automatic security model selection so that changes to the development codes may be analyzed faster by detecting and correcting potential security threat objects before the application product release. For example, certain changes and new components or features may be applied to some applications more rapidly and frequently. Some security models may be implemented more often than others for detecting and mitigating application security threats. The run-time security models may be web applications executed to perform run-time analysis on running instances of the application and the combination development code sets to detect security threats objects. New requirement changes may be made to one or more application code sets before releasing the application product. The disclosed system may provide effective and efficient solutions to detect and remediate threat objects quickly and earlier in real time before the application product release. Thus, the network communication bandwidth among the computer systems is not wasted and the disclosed processes improve the operations of the CI/CD pipeline process and the computer system overall.

Accordingly, the disclosed system may be integrated into a practical application of improving threat analysis of a large number of development code sets associated with an application in real time, which further improves memory storage capacity utilization that would otherwise be spent using the current technology. The disclosed system improves a threat analysis timeline of the current security analysis and control process by determining when and how to apply one or more security models for an application. The disclosed system conserves processing and memory resources used for the application product development in the CI/CD pipeline process and the computer system overall. As such, it improves the whole process of the application product design, development, test, and employment operations in the CI/CD pipeline process efficiently and effectively.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions to detect and mitigate security threats in development code sets associated with an application product in a network. This disclosure provides various systems and methods to detect and mitigate security threats in the development code sets associated with the application product in the network by referring to FIGS. 1-2 and 3A-3B.

Example System for Detecting and Mitigating Security Threats

Figure 1:
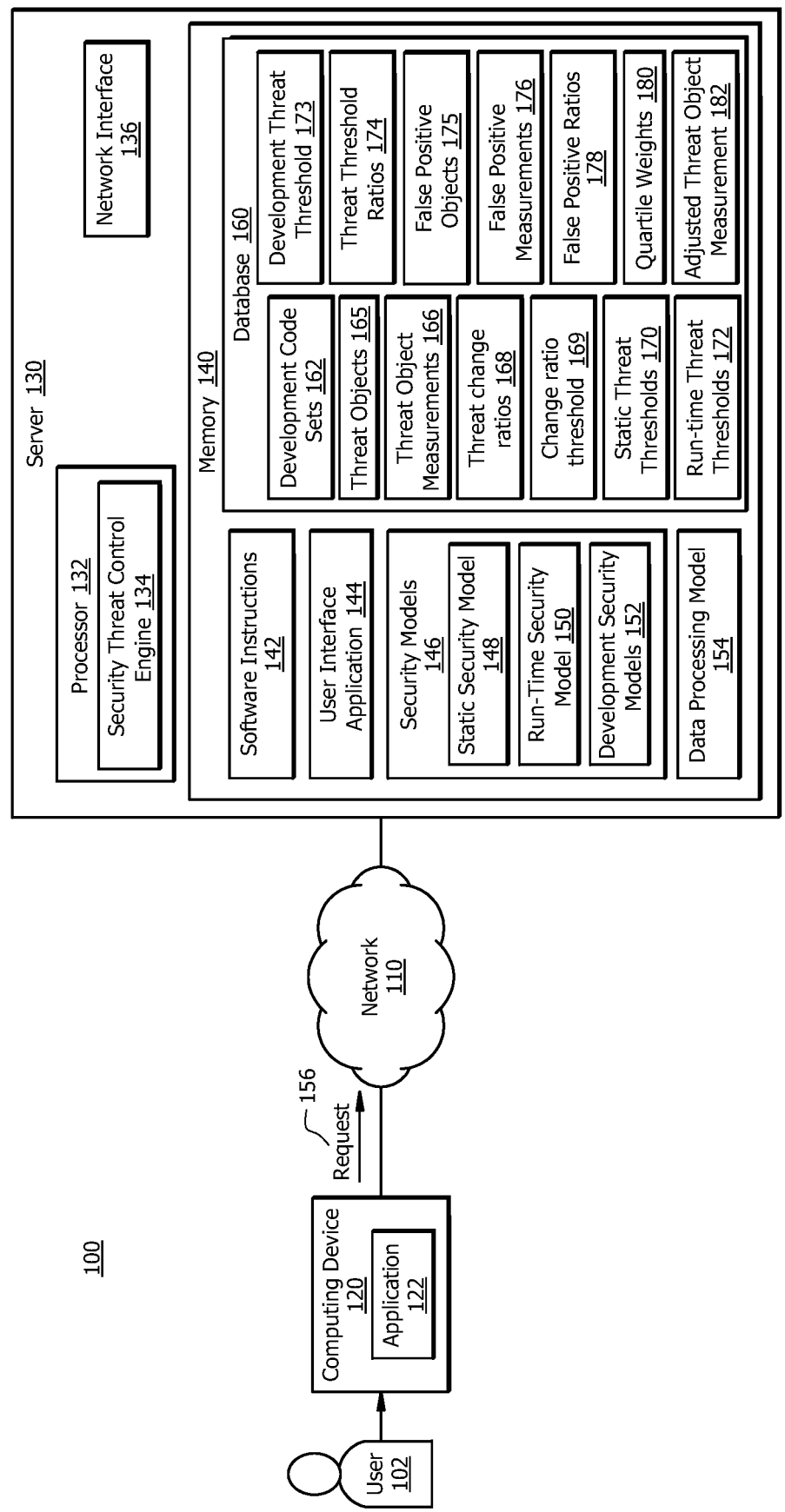
FIG. 1 illustrates an embodiment of a system configured to detect and mitigate application security threats according to an illustrative embodiment of the present disclosure.

FIG. 1 illustrates one embodiment of a system 100 that is configured to detect and mitigate application security threats in development code sets associated with an application product in a network 110. In one embodiment, system 100 comprises a server 130. In some embodiments, system 100 further comprises a network 110, a computing device 120, and one or more databases 160. Network 110 enables the communication between components of the system 100. Server 130 comprises a processor 132 in signal communication with a memory 140. Memory 140 stores software instructions 142 that when executed by the processor 132, cause the processor 132 to execute one or more functions described herein. For example, when the software instructions 142 are executed, the processor 132 executes a security threat control engine 134 to perform operations in an operational flow 200 illustrated in FIG. 2 in conjunction with methods 300A and 300B illustrated in FIGS. 3A and 3B. In other embodiments, system 100 may not have all the components listed and/or may have other elements instead of, or in addition to, those listed above.

System Components
Network

Network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Computing Device

Computing device 120 is generally any device that is configured to process data and interact with users 102. Examples of the computing device 120 (e.g., a user device) include, but are not limited to, a personal computer, a desktop computer, a workstation, a server, a laptop, a tablet computer, a mobile phone (such as a smartphone), etc. The computing device 120 may include a user interface, such as a display, a microphone, keypad, or other appropriate terminal equipment usable by user 102. The computing device 120 may include a hardware processor, memory, and/or circuitry configured to perform any of the functions or actions of the computing device 120 described herein. The hardware processor may include one or more processors operably coupled to the memory. The one or more processors may be any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The one or more processors may be a programmable logic device, a microcontroller, a microprocessor, or any suitable combination of the preceding. The one or more processors are configured to process data and may be implemented in hardware or software. For example, the processor may be 8-bit, 16-bit, 32-bit, 64-bit, or of any other suitable architecture. The processor may include an arithmetic logic unit (ALU) for performing arithmetic and logic operations. For example, a software application designed using software code may be stored in the memory and executed by the processor to perform the functions of the computing device 120.

The computing device 120 stores and/or includes the application 122. The application 122 may be a software, mobile, or web application. The application 122 can be accessed from the computing device 120 to facilitate user interactions with the server 130 and may be configured to transmit data to and receive data from the server 130 via network 110. The application 122 may be associated with an organization entity that provides services and/or products to users 102. The user 102 may use the application 122 to log into their profiles, access their profile data, view their profile information, etc. The profile data may be linked to one or more development code sets associated with the application product which the user is authorized to access and update. This process to enable the user 102 to access their profile to access and update corresponding development code sets associated with the application product may be further in conjunction with an operational flow 200 described in FIG. 2 and methods 300A and 300B illustrated in FIGS. 3A and 3B.

Server

Server 130 is generally a server, or any other device configured to process data and communicate with computing devices (e.g., computing device 120), etc., via the network 110. The server 130 is generally configured to oversee the operations of the security threat control engine 134, as described further below in conjunction with the operational flow 200 described in FIG. 2 and the methods 300A and 300B illustrated in FIGS. 3A-3B. The server 130 may be a central server implemented in the cloud and may also be organized in a distributed manner.

Server 130 comprises one or more processors operably coupled to the memory 140. The server 130 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 132 may be a programmable logic device, a microcontroller, a microprocessor, or any suitable combination of the preceding. The one or more processors are configured to process data and may be implemented in hardware or software. For example, the processor 132 may be 8-bit, 16-bit, 32-bit, 64-bit, or of any other suitable architecture. The processor 132 may include an arithmetic logic unit (ALU) for performing arithmetic and logic operations. The processor 132 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 142) to implement the security threat control engine 134. In this way, the processor 132 may be a special-purpose computer designed to implement the functions disclosed herein. In one embodiment, the processor 132 is implemented using logic units, FPGAs, ASICs, DSPs, or any other suitable hardware. The processor 132 is configured to operate to perform one or more operations as described in FIGS. 2 and 3A-3B.

Network interface 136 is configured to enable wired and/or wireless communications (e.g., via network 110). The network interface 136 is configured to communicate data between the server 130 and other devices (e.g., computing device 120), databases, systems, or domains. For example, the network interface 136 may comprise a WIFI interface, a local area network (LAN) interface, a wide area network (WAN) interface, a modem, a switch, or a router. The processor 132 is configured to send and receive data using the network interface 136. The network interface 136 may be configured to use any suitable type of communication protocol as would be appreciated by one of ordinary skill in the art.

Memory 140 may be volatile or non-volatile and may comprise a read-only memory (ROM), random-access memory (RAM), ternary content-addressable memory (TCAM), dynamic random-access memory (DRAM), and static random-access memory (SRAM). Memory 140 may be any non-transitory computer-readable medium that stores software instructions 142 executed by a processor 132. Memory 140 may be implemented using one or more disks, tape drives, solid-state drives, and/or the like. Memory is operable to store the software instructions 142 and/or any other data or instructions. The software instructions 142 may store any suitable set of instructions, logic, rules, or code operable to be executed by the processor 132 to implement the processes and embodiments described below. The software instructions 142 may include different models executed by the processor 132 to implement operational flows of the system of FIG. 1.

In an example operation, the memory 140 may store software instructions 142, user interface application 144, security models 146, data processing model 154, and other program modules which are implemented in computer-executable software instructions. The security models 146 may include different functional security control models applied to development code sets associated with the application product to perform corresponding threat analysis at different stages in a continuous integration and continuous delivery (CI/CD) pipeline. The user interface application 144 is configured to facilitate communications and operations of the server 130 through a user interface of the server 130. The security models 146 may include a static security model 148, a run-time security model 150, and one or more development security models 152. A static security model 148 may be a static application security testing model executed by the processor 132 at the code set development stage. A run-time security model 150 may be a dynamic application security testing model executed by the processor 132 to analyze the development code sets to detect and remediate threat objects continuously when the application is running during the CI/CD pipeline process. The system may determine whether to execute the one or more development security models 152 to further analyze security threats based on the analysis results of the run-time security model 150.

Database 160 may be a remote database, a cloud database, or an on-site internal database. Database 160 may be coupled to or in communication with and accessed by the server 130 via the network 110. As illustrated in FIG. 1, the database 160 is an internal database and store information including a group of development code sets 162, threat objects 165, threat object measurements 166, threat change ratios 168, change ratio threshold 169, static threat thresholds 170, run-time threat thresholds 172, development threat thresholds 173, threat threshold ratios 174, false positive objects 175, false positive measurements 176, false positive ratios 178, quartile weights 180, and adjusted threat object measurements 182.

Security Threat Control Engine

A security threat control engine 134 may include, but is not limited to, one or more separate and independent software and/or hardware components of a server 130. In some embodiments, the security threat control engine 134 may be implemented by the processor 132 by executing the software instructions 142 to process development code sets associated with an application product. In some embodiments, a set of security models 146 may be deployed into one of the components of the security threat control engine 134 of the server 130. The set of security models 146 are associated with different software product quality assessment processes of a continuous integration/continuous deployment (CI/CD) pipeline at different development stages. For example, the set of security models 146 may include a static security model 148 configured to scan and analyze the development code sets to identify threat objects in the application product at a product development stage. The set of security models 146 may include a run-time security model 150 configured to scan and analyze the development code sets to identify threat objects while the development code sets of the application product are running. The run-time security analysis may be performed without visibility into the development code sets or the source codes. In some embodiments, the threat objects detected by executing the run-time security model 150 may not be detected by executing the static security model 148. The set of security models 146 may include a development security models 152 configured to scan and analyze corresponding development code sets to detect threat objects more accurately with a better visibility to remediate the detected threats objects. The security threat control engine 134 may be implemented by the processor 132 by executing the security models 146 in parallel or after one or more other software models as described above, e.g., a data processing model 154. The operation of the disclosed system 100 is described below.

Figure 2:
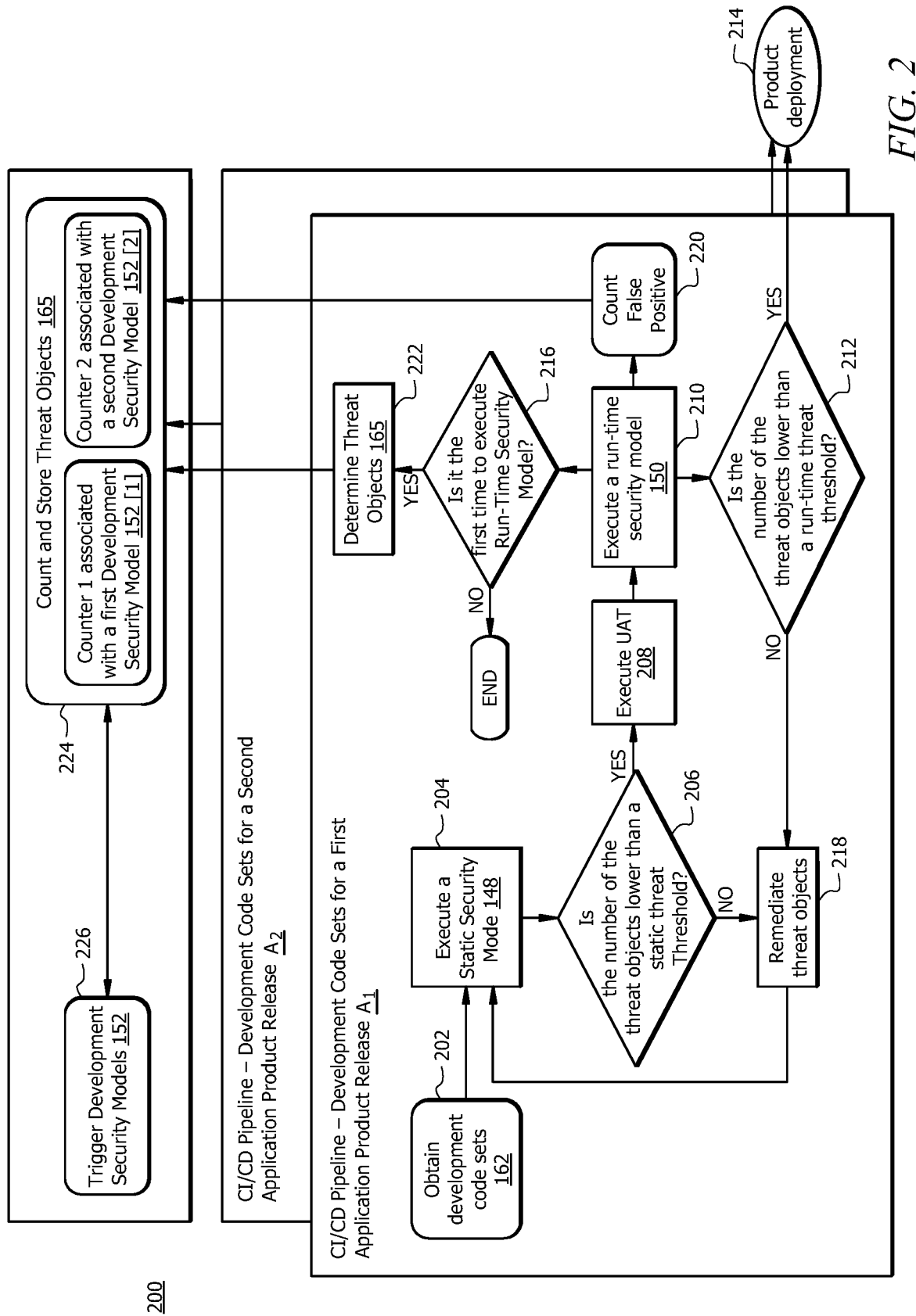
FIG. 2 illustrates an example operational flow of the system of FIG. 1 to detect and mitigate application security threats.
Figure 3A:
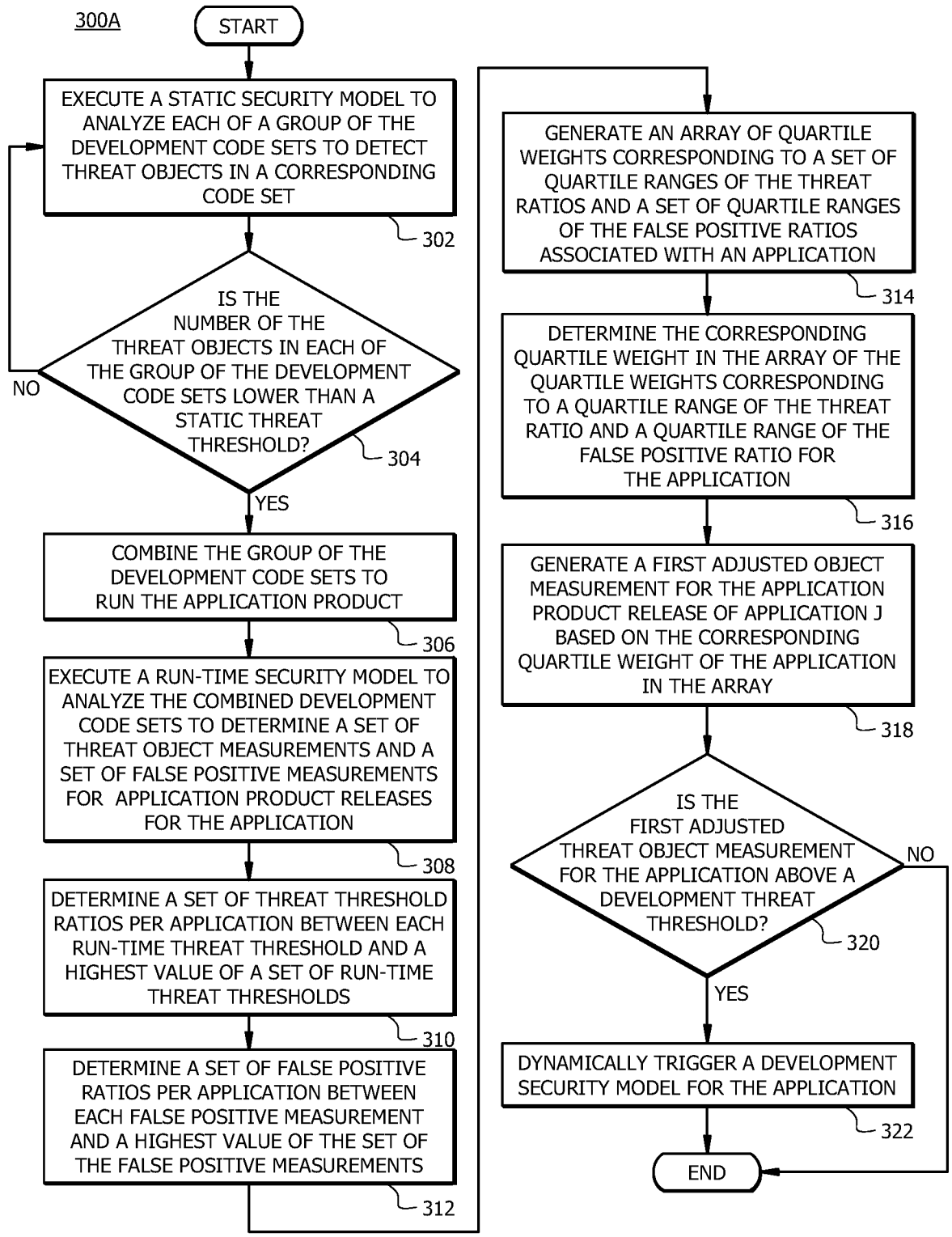
FIG. 3A illustrates an example operational flow of a method for detecting and mitigating application security threats based on quantitative analysis.
Figure 3B:
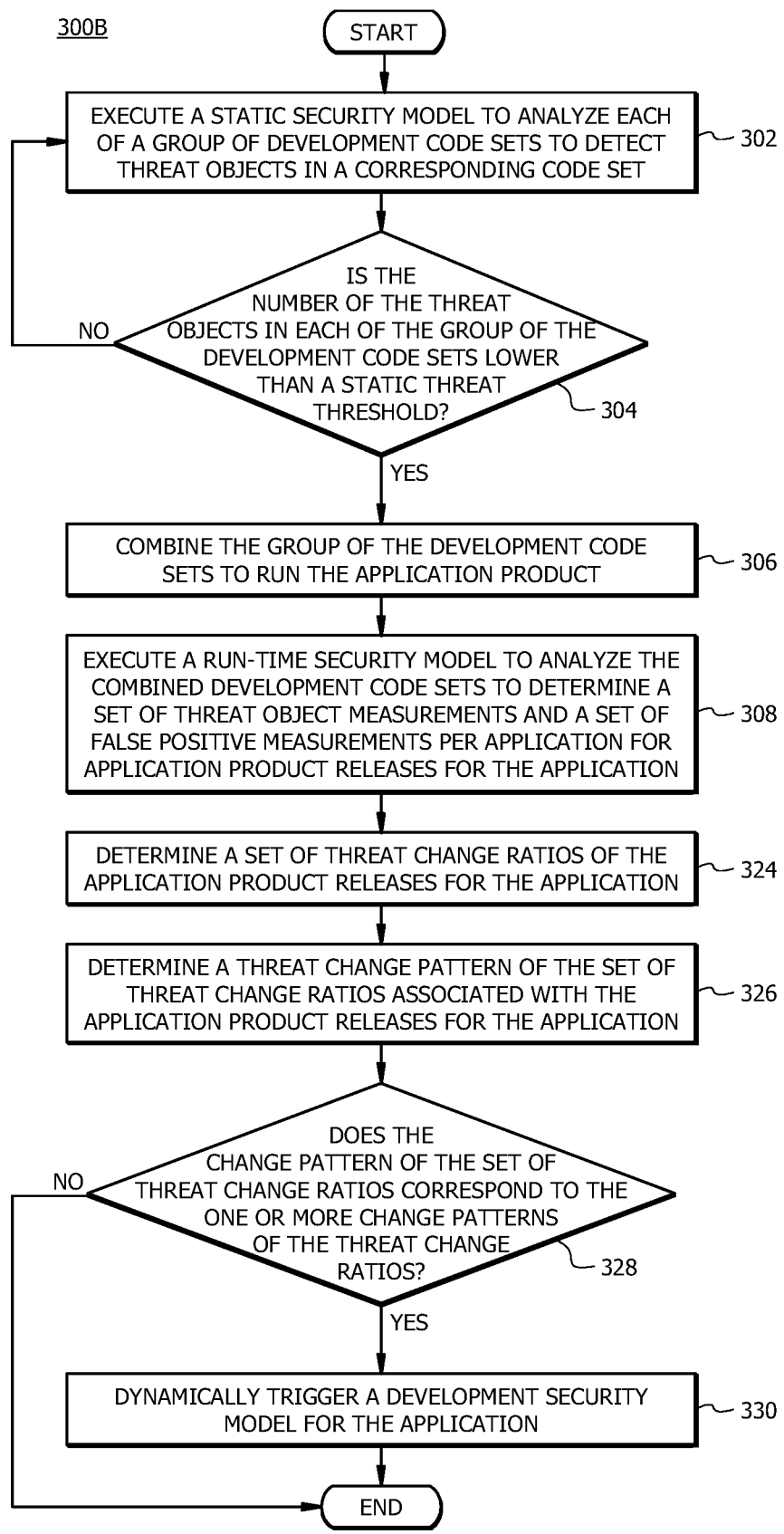
FIG. 3B illustrates another example operational flow of a method for detecting and mitigating application security threats based on threat change patterns.

Example Operational Flow for Detecting and Mitigating Application Security Threats Accessing Development Code Sets Associated with an Application Product FIG. 2 illustrates an example operational flow 200 of the system 100 of FIG. 1 in conjunction with the methods 300A and 300B of FIGS. 3A-3B to detect and mitigate application security threats. The operational flow 200 may be implemented for multiple applications in a respective CI/CD pipeline process. FIG. 2 depicts a CI/CD pipeline process of one single application and multiple application product releases for that application. The operations may be performed by the server 130 for detecting and mitigating application security threats in a group of development code sets 162 associated with a first application product release in the CI/CD pipeline process. The operations of the example operational flow 200 may be performed by the server 130 for detecting and mitigating application security threats in a group of development code sets associated with a second application product release in the CI/CD pipeline process. For example, one or more operations of the example operational flow 200 may be implemented, at least in part, in the form of software instructions 142 of FIG. 1, stored on non-transitory, tangible, machine-readable media (e.g., memory 140 of FIG. 1) that when run by one or more processors (e.g., processor 132 of FIG. 1) may cause the one or more processors to perform operations 202-226. The operations of the example operational flow 200 may be performed by the server 130 for detecting and mitigating application security threats in the system 100 in parallel or in any suitable order.

In one embodiment, the server 130 stores a group of development code sets 162 associated with an application product in a corresponding time sequence in a database 160. The operational flow 200 begins at operation 202 where the server 130 accesses a database 160 and obtains a group of development code sets 162 (e.g., 162[1] and 162[2]) associated with a first application product release for performing security analysis to detect threat objects in the development code sets 162.

Each threat object represents an application security threat which may cause the functionality of development code sets of an application product operating incorrectly. The group of development code sets 162 may be generated or modified in a time sequence. Each application development code set (e.g., 162[i]) is configured to be executed to implement a particular computing function associated with the application product.

Each development code set may be created or modified at certain time with a timestamp corresponding to some changes associated with the application product. The changes may indicate that some features are modified, added to, or deleted from the corresponding development code sets associated with the application product. Referring back to FIG. 1, the server 130 may process a user request 156 to sign onto an application product or an application via a user interface application 122 through a computing device 120 associated with a user 102 via the network 110. The server 130 may authorize the user 102 through the computing device 120 to add new features and modify the previous features of corresponding development code sets of the application.

Determining Threat Objects of Development Code Sets

The security threat control engine 134 may be implemented by the processor 132 executing different security models 146 to detect threat objects, determine threat object measurements 166, threat threshold ratios 174 corresponding to a development code sets, and false positive ratios 178 of the development code sets based an operational flow 200. The server 130 may include a static security model 148 configured to identify threat objects at a code development stage. The server 130 may include a run-time security model 150 configured to identify threat objects while the development code sets of the application product are running. In some embodiment, each development code set may correspond to different functionality of the application product. Based on the functionality related to source codes associated with each development code set, each development code set may be associated with a different corresponding static threat threshold 170 and a different corresponding run-time threat threshold 172. The static threat thresholds 170 may correspond to different static threat tolerance criteria based on different functionality of the application product. The static threat thresholds 170 are defined for each corresponding development code sets during the static security analysis before the application product release. The run-time threat thresholds 172 may correspond to different run-time threat tolerance criteria based on different functionality of the development code sets of the application product. The run-time threat thresholds 172 are each defined for an application product during the run-time security analysis before the application product release.

At operation 204, the server 130 may implement the security threat control engine 134 to execute the static security model 148 to scan and analyze a development code set 162[i] including byte code and binary codes at the code development stage. The development code set 162[i] represents one of a group of development code sets 162.

At operation 206, the server 130 may detect a number of threat objects in each development code set 162[i] in the group to determine whether the number of the threat objects is lower than a static threat threshold 170. At operation 218, in response to determining that the number of the threat objects of each development code set 162[i] is not lower than a corresponding static threat threshold 170, the server 130 may remediate the corresponding threat objects based on user inputs and reevaluate the corresponding development code set 162 in the group by executing the static security model 148.

In some embodiments, the operational flow 200 may include iteration operations with operations 202, 204, 206 and 218 to detect threat objects by executing the static security model 148 and remediating the corresponding threat objects in the development code sets 162.

At operation 208, in response to determining that the number of the threat objects of each development code set 162[i] is lower than the corresponding static threat threshold 170, the server may combine the group of development code sets 162 to run the development code sets 162 of the application product. The server 130 may conduct user acceptance testing (UAT) to execute the security threat control engine 134 to allow threat objects to be detected and remediated by executing run-time security model 150.

At operation 210, the server 130 may implement the security threat control engine 134 to execute a run-time security model 150 to scan and analyze a combined development code sets 162 while the application product are running. The server 130 may detect and determine a number of corresponding threat objects in the combined development code sets 162 during the run-time security analysis.

In one embodiment, at operation 212, the server 130 determines whether the number of the threat objects in the combined development code sets is lower than a corresponding run-time threat threshold 172.

At operation 218, in response to determining that the number of the threat objects in the combined development code sets 162 is not lower than the corresponding run-time threat threshold 172, the server 130 may remediate the corresponding threat objects based on user inputs and reevaluate the combined development code sets 162 by executing the static security model 148.

At operation 214, in response to determining that the number of the threat objects in the combined development code sets 162 is lower than the corresponding run-time threat threshold 172, the server 130 may deploy the combined development code sets 162 into the application product release. The combined development code sets 162 may become a first application product release and deployed in production.

In some embodiments, the operational flow 200 may include iteration operations with operations 204, 206, 208, 210, 212, and 218 to detect threat objects by executing the static security model 148 and run-time security model 150, and remediating the corresponding threat objects in the development code sets 162.

At operation 216, the server 130 may determine whether it is the first time to execute the run-time security model 150 to scan and analyze the combined development code sets 162. The combined development code sets 162 create the run time code for the application product release.

At operation 222, the server 130 may determine threat objects 165 in the combined development code sets 162 in response to determining that it is the first time to execute the run-time security model 150 to scan and analyze the combined development code sets 162.

At operation 224, the server 130 may count and store threat objects 165 and false positive objects 175 detected in the corresponding development code sets. The server 130 may determine a set of threat object measurements 166. Each threat object measurement 166 represents a number of threat objects detected in combined development code sets 162. For example, an array (Y) may be represented as the number of corresponding threat objects $(Y_1, Y_2, \ldots, Y_i)$ detected in a first application product release $A_1$, a second application product release $A_2$, \ldots, and an i'th application product release $A_i$, respectively. The number of corresponding threat objects $(Y_1, Y_2, \ldots, Y_i)$ may be indicative of a set of threat object measurements 166 for the corresponding application product releases $A_1$-$A_i$. For example, the server 130 may execute a data processing model 154 to implement a first counter (Counter 1 in FIG. 2) and a second counter (Counter 2 in FIG. 2). The counters may be configured to store the number of corresponding false positive objects 175. The first counter (Counter 1 in FIG. 2) may be configured to count and store the number of threat objects 165 detected in the first time when the run-time security model 150 is executed on the combined development code sets 162 associated with the corresponding application product releases. The first counter (Counter 1 in FIG. 2) may be configured to generate a first cumulative sum of the number of the threat objects $(Y_1, Y_2, \ldots, Y_i)$ for a development security model 152[1]. The first cumulative sum represents the sum of the threat object measurements 166 for the corresponding application product releases, namely the first application product release $A_1$, the second application product release $A_2$, ..., and the i'th application product release $A_i$, respectively. The second counter (Counter 2 in FIG. 2) may be configured to generate a different cumulative sum of the threat object measurements for the corresponding development security model 152[2].

The server 130 may determine whether to trigger a development security model 152[1] or 152[2] based on the adjusted threat object measurement 182 and a corresponding development threat threshold 173. The detail about generating the adjusted threat object measurement 182 is described below.

Determining Threat Change Ratios of Development Code Sets

The server 130 may generate a set of threat change ratios for the group of the development code set 162. In one embodiment, the server 130 generates a set of change ratios $(Y_2/Y_1, \ldots, Y_i/Y_1)$ of the application product releases $A_1$-$A_i$ based on the first threat object measurement $(Y_1)$ of the first application product release $A_1$ and the set of the threat object measurements 166 which is indicative of the number of the threat objects $(Y_2, \ldots, Y_i)$ after the first threat object measurement.

Determining a Threat Change Pattern of a Set of Threat Change Ratios of Development Code Sets The security threat control engine 134 may be implemented by the processor 132 executing a data processing model 154 to determine a threat change pattern of a set of threat change ratios $(Y_2/Y_1 \ldots Y_i/Y_1)$ of the application product releases $A_1$-$A_i$, namely the first application product release $A_1$, the second application product release $A_2$, ..., and the i'th application product release $A_i$. The server 130 may determine whether the set of the threat change ratios 168 corresponds to the one or more threat change patterns.

In one embodiment, the server 130 may determine that a set of threat change ratios includes a set of consecutive values which are bigger than a change ratio threshold 169. The number of the consecutive values is larger than a first predetermined number $(N_1)$. For example, the change ratio may be bigger than the first predetermined number (N1) for the consecutive number (K) of times.

In one embodiment, the server 130 may determine that the set of threat change ratios includes a set of values which are bigger than the predetermined threshold $(N_1)$ for a second predetermined number L of times within a partial set of threat change ratios. For example, the partial set of threat change ratios may be the latest third predetermined number $(N_3)$ of the development code sets corresponding to the time sequence. The number of the threat change ratios with the values greater than the third predetermined number $(N_3)$ is more than the second predetermined number (L) within a partial set of threat change ratios.

In one embodiment, the server 130 may determine that the set of threat change ratios includes a value bigger than a fourth predetermined number $(N_4)$.

In some embodiments, the server 130 may dynamically adjust the parameters of the threat change patterns of the set of threat change ratios associated with the application product releases $A_1$-$A_i$ to determine whether to trigger and execute a development security model 152. For example, the server 130 may dynamically adjust the parameters including the change ratio threshold 169, the first predetermined number $(N_1)$, the second predetermined number L, the third predetermined number $(N_3)$, and the fourth predetermined number $(N_4)$. In response to determining that there are one or more of the described threat change patterns of the set of threat change ratios 168, the server 130 determines to dynamically trigger and execute a development security model 152 for an application.

Generating an Adjusted Object Measurement Corresponding to a Quartile Range of Threat Threshold Ratios and a Quartile Range of False Positive Ratios The server 130 may implement the security threat control engine 134 to execute a data processing model 154 to generate an array (Y) of quartile weights 180 for evaluating the number of corresponding detected threat objects $(Y_1, Y_2, \ldots, Y_i)$ respectively for application product releases $A_1$-$A_i$, namely the first application product release $A_1$, the second application product release $A_2$, ..., and the i'th application product release. The array of quartile weights 180 may be determined corresponding to a set of quartiles of threat threshold ratios 174 and a set of quartiles of false positive ratios 178.

The run-time threat thresholds 172 may represent different run-time threat tolerance criteria corresponding to the application. Each run-time threat threshold 172 may be defined to evaluate the number of threat objects 165 in the corresponding combined development code sets during the run-time security analysis before the application product release. For example, an array (R) may be represented as a set of values $(R_1, R_2, \ldots, R_j)$ of the run-time threat thresholds 172 which are defined for multiple applications, such as an application 1, application 2, ..., application j, respectively. Each run-time threat threshold may be defined for each application. The value $(R_j)$ may represent a run-time threat threshold 172 defined as a threat tolerance criteria for an application j. A higher value $(R_j)$ of a run-time threat threshold may cause a higher value $(Y_i)$ of the number of the threat objects in the application product release $A_i$ for the application j. With a higher value $(R_j)$, the future application product releases may be exposed to non-remediated threats from previous code set releases repeatedly.

The server 130 may determine a highest value $(R_h)$ in the array (R) of the run-time threat thresholds 172. The server 130 may generate a set of threat threshold ratios 174 based on the run-time threat thresholds 172. In one embodiment, the server 130 may determine a set of threat threshold ratios 174 as a set of values $(R_1/R_h, R_2/R_h, \ldots, R_j/R_h)$ based on each run-time threat threshold 172 and a highest value $(R_h)$ of the array (R) of the run-time threat thresholds 172. If the threat threshold ratio 174 is closer to 1, then the application product has a less strict threat tolerance criteria, where the threats from previous code sets may have a higher impact on the number of threat objects of future releases.

At operation 210, the server 130 may execute a run-time security model 150 and detect false positive objects in an output of the run-time security model 150 for the combined development code sets 162 of the application product releases for the application based on the analysis results of the run-time security model 150.

At operation 220, the server 130 may count the false positive to determine a set of false positive measurements 176. Each false positive measurement represents a number of false positive objects detected in the corresponding application product release for a corresponding application. The corresponding false positive objects are data objects which may be falsely detected and flagged to be threat objects by the server 130 based on the analysis results of the run-time security model 150. A false positive object may be related to an operation which is actually acceptable.

For example, an array (FP) may be represented as the number of corresponding detected false positive objects $(FP_1, FP_2, \ldots, FP_j)$ for the applications, such as an application 1, application 2, . . . , application j, respectively. A false positive measurement 176 represents the number of corresponding false positive objects ($FP_j$) for the application j. In some embodiments, each false positive measurement 176 may represent a value of the average number of false positive objects associated with the combined development code sets which are released at different times.

The server 130 may determine a highest value ($FP_h$) in the array (FP) of the set of the false positive measurements 176 associated with the applications. The server 130 may generate a set of false positive ratios 178 for the applications. In one embodiment, the server 130 determines a set of false positive ratios ($FP_1/FR_h$, $FP_2/FR_h$, . . . , $FP_j/FP_h$) 178 of the application 1, the application 2, . . . , and the application j, respectively, based on each false positive measurement and a highest value ($FP_h$) of the set of the false positive measurements 176. For example, each false positive ratio ($FP_j/FP_h$) is a ratio of a false positive measurement $FP_j$ for the application j and a highest value ($FP_h$) of the set of the false positive measurements 176 associated with the applications.

The server 130 may group the applications based on the values of the threat threshold ratios ($R_j/R_h$) and the false positive ratios ($FP_j/FP_h$). The server 130 may rank the set of false positive ratios ($FP_j/FP_h$) to generate a set of quartile ranges of the false positive ratios ($FP_j/FP_h$) illustrated in each column in table 1. The server 130 may rank the set of the threat threshold ratios ($R_j/R_h$) to generate a set of quartile ranges of the threat threshold ratios ($R_j/R_h$) illustrated in each row in table 1.

The server 130 may generate an array of quartile weights (QW) 180 illustrated in table 1. A value of each quartile weight is configured to map to a quartile range of threshold ratios ($R_j/R_h$) and a quartile range of the false positive ratios ($FP_j/FP_h$) shown in an array of quartile weights (QW) illustrated in table 1.

TABLE 1

An array of quartile weights (QW)

| | $FP_j/FP_h$ | | | |
|---|---|---|---|---|
| $R_j/R_h$ | 0-25% Quartile | 25%-50% Quartile | 50%-75% Quartile | 75%-100% Quartile |
| 0-25% Quartile | 1 | 0.8 | 0.7 | 0.6 |
| 25%-50% Quartile | 0.8 | 0.7 | 0.6 | 0.5 |
| 50%-75% Quartile | 0.7 | 0.6 | 0.5 | 0.4 |
| 75%-100% Quartile | 0.6 | 0.5 | 0.4 | 0.3 |

The server 130 may determine a corresponding quartile weight from the array of quartile weights (QW) 180 for the application j based on a threat threshold ratios ($R_j/R_h$) and a false positive ratios ($FP_j/FP_h$) associated with the application j. For example, the server 130 may identify the application j has a threat threshold ratio ($R_j/R_h$) in a quartile range (25%-50%). The server 130 may identify the application j has a false positive ratio ($FP_j/FP_h$) in a quartile range (0-25%). The server 130 may identify a value (0.8) of a quartile weight from the array of quartile weights (QW) corresponding to the identified threat threshold ratio ($R_j/R_h$) in a quartile range (25%-50%) and the identified false positive ratio ($FP_j/FP_h$) in a quartile range (0-25%).

The server 130 may generate a first adjusted threat object measurement by multiplying the value (0.8) of quartile weight (QW) with a first cumulative sum of the number of the threat objects ($Y_1, Y_2, \ldots, Y_i$) for the corresponding application product releases. Each application has one and only one quartile weight (QW) value. The same quartile weight (QW) value is applied to the number of the threat objects ($Y_1, Y_2, \ldots, Y_i$) of the corresponding application product releases of this application.

In some embodiments, the first counter (Counter 1 in FIG. 2) may be associated with a first development security model 152[1] which is defined with a first development threat threshold 173[1]. The second counter 2 (Counter 2 in FIG. 2) may be associated with a second development security model 152 [2] which is defined with a second development threat threshold 173[2].

The server 130 may determine whether a first adjusted threat object measurement 182[1] for the application j is above a first development threat threshold 173[1] associated with the development security model 152[1]. The first development threat threshold 173[1] may be indicative of a value of P. The server 130 may determine whether a second adjusted threat object measurement 182[2] for the application j is above a second development threat threshold 173 [2].

At operation 226, the server 130 may determine to dynamically trigger the first development security model 152 [1] for the application j in response to determining that a first adjusted threat object measurement 182 is above a corresponding development threat threshold 173[1]. The server 130 may determine to trigger the second development security model 152[2] for the application j in response to determining that the corresponding adjusted threat object measurement 182 is above the corresponding development threat threshold 173[2].

In some embodiments, the operational flow 200 may include a set of operations including operations 202, 204, 206, 208, 210, 216, 222, 224, and 226 to detect threat objects by executing the static security model 148 and run-time security model 150, and determine to trigger and execute the one or more development security models 152 to further analyze security threats for the application j.

Example Operational Flow for Detecting and Mitigating Application Security Threats FIG. 3A illustrates an example flow of a method 300A for detecting and mitigating application security threats in the system 100. Modifications, additions, or omissions may be made to method 300A. Method 300A may include more, fewer, or other operations. For example, operations may be performed by the server 130 in parallel or in any suitable order. While at times discussed as the system 100, processor 132, a security threat control engine 134, a set of security models 146, a data processing model 154, or components of any of thereof performing operations, any suitable system or components of the system may perform one or more operations of the method 300A. For example, one or more operations of method 300A may be implemented, at least in part, in the form of software instructions 142 of FIG. 1, stored on non-transitory, tangible, machine-readable media (e.g., memory 140 of FIG. 1) that when run by one or more processors (e.g., processor 132 of FIG. 1) may cause the one or more processors to perform operations 302-322.

The method 300A begins at operation 302 where the server 130 executes a static security model 148 to analyze each of a group of the development code sets 162 to detect a number of corresponding threat objects 165 in each development code set.

At operation 304, the server 130 determines whether the number of the threat objects 165 detected in each development code set is lower than a static threat threshold 170.

At operation 306, the server 130 combines the group of the development code sets 162 to run the application product in response to determining that the number of the threat objects in each development code set is lower than the static threat threshold 170.

At operation 308, the server 130, in response to running the application product, executes a run-time security model 150 to analyze the combined development code sets 162 to determine a set of threat object measurements 166 and a set of false positive measurements 176 for a plurality of application product releases for the application j. Each threat object measurement 166 represents a number of threat objects 165 detected in the combined development code sets 162 of each application product release for the application j. Each false positive measurement 176 represents a number of false positive detected in the combined development code sets of each application product release for the application j while the corresponding threat objects are falsely detected.

At operation 310, the server 130 determines a set of threat threshold ratios ($R_1/R_h$, $R_2/R_h$, . . . , $R_j/R_h$) per application between each value ($R_j$) of the run-time threat threshold 172 and a highest value ($R_h$) of a set of run-time threat thresholds 172.

At operation 312, the server 130 determines a set of false positive ratios ($FP_1/FR_h$, $FP_2/FR_h$, . . . , $FP_j/FP_h$) per application between each false positive measurement (FPS) and a highest value ($FP_h$) of the set of the false positive measurements 176. The server 130 may rank the set of threat threshold ratios ($R_j/R_h$) to generate the set of quartile ranges of the threat threshold ratios. The server 130 may rank the set of false positive ratios ($FP_j/FP_h$) to generate the set of the quartile ranges of the false positive ratios. The server 130 groups the applications based on the set of the quartile ranges of the threat threshold ratios and the set of quartile ranges of the false positive ratios.

At operation 314, the server 130 generates an array of quartile weights 180 corresponding to a set of quartile ranges of the threat threshold ratios ($R_j/R_h$) and a set of quartile ranges of the false positive ratios ($FP_j/FP_h$) associated with the application j. Each quartile weight corresponds to one of quartile ranges of the threat threshold ratios ($R_j/R_h$) and one of the false positive ratios ($FP_j/FP_h$) as illustrated in table 1. In some embodiments, the server 130 ranks the set of threat threshold ratios to generate the set of quartile ranges of the threat threshold ratios. The server 130 ranks the set of false positive ratios to generate the set of the quartile ranges of the false positive ratios.

At operation 316, the server 130 determines the corresponding quartile weight 180 in the array of the quartile weights (QW) corresponding to a quartile range of the threat threshold ratio and a quartile range of the false positive ratio for the application j. Referring back to FIG. 2, the server 130 may identify a development code set has a threat threshold ratio ($R_j/R_h$) in a corresponding quartile range. The server 130 may identify the same development code set has a false positive ratio ($R_j/R_h$) in a corresponding quartile range. The server 130 may identify a value of quartile weight from the array of quartile weights (QW) corresponding to the threat threshold ratio ($R_j/R_h$) in a quartile range and the false positive ratio ($FP_j/FP_h$) in a quartile range.

At operation 318, the server 130 generates a first adjusted threat object measurement 182 of the application product releases for the application j based on the value of the corresponding quartile weight 180 of the application j in the array of the quartile weights (QW). In one embodiment, the server 130 may generate the first adjusted threat object measurement 182 by multiplying the corresponding quartile weight (QW) with a cumulative sum of the corresponding threat object measurements 166 or the sum of the threat objects ($Y_1, Y_2, \ldots, Y_i$) of the application product releases for the application j.

Referring to operation 224 in FIG. 2, the server 130 may execute multiple counters to generate a corresponding cumulative sum of the threat object measurements for the application j. The server 130 may generate a corresponding adjusted threat object measurement 182 for the application j.

At operation 320, the server 130 determines whether the first adjusted threat object measurement 182 for the application j is above a development threat threshold 173 associated with a development security model 152.

At operation 322, in response to determining that the adjusted threat object measurement 182 for the application j is above a development threat threshold 173, the server 130 may dynamically trigger a development security model 152 for the application j. Referring to operation 226 in FIG. 2, the server 130 may determine to dynamically trigger other corresponding development security models 152 for the application j in response to determining that a corresponding adjusted threat object measurement 182 is above a corresponding development threat threshold 173.

FIG. 3B illustrates another example operational flow of a method 300B for detecting and mitigating application security threats based on threat change patterns. The example operational flow of the method 300B includes the same operations 302-308 from FIG. 3A and the continuation operations 324-330. For example, one or more operations of method 300B may be implemented, at least in part, in the form of software instructions 142 of FIG. 1, stored on non-transitory, tangible, machine-readable media (e.g., memory 140 of FIG. 1) that when run by one or more processors (e.g., processor 132 of FIG. 1) may cause the one or more processors to perform operations 302-308 and 324-330 in FIG. 3B.

At operation 324, the server 130 analyzes the a set of threat object measurements 166 obtained from the operation 308. The set of threat object measurements 166 is associated with application product releases $A_1$-$A_i$ for the application j corresponding to the time sequence. The server 130 determines a set of threat change ratios 168 of the application product releases $A_1$-$A_i$ for the application j based on the first threat object measurement and the threat object measurements after the first threat object measurement of the set of threat object measurements 166.

At operation 326, the server 130 determines a threat change pattern of the set of threat change ratios 168 associated with the application product releases $A_1$-$A_i$ for the application j. The threat change pattern of the set of threat change ratios 168 may be associated with a number of values of threat change ratios bigger than a certain change ratio threshold. The threat change pattern of the set of threat change ratios may reflect how the development code sets 162 are changed in the time sequence.

The change pattern of the threat change ratios 168 may be determined based on at least one of a ratio threshold, a set of consecutive threat change ratios bigger than a certain change ratio threshold 169, and the timestamps of the threat change ratios which are bigger than a certain change ratio threshold. For example, the change pattern may be the number of consecutive change ratios having a value bigger than a change ratio threshold 169 or a certain number.

The change pattern may be related to the number of consecutive threat change ratios 168 which has a value bigger than a change ratio threshold 169 in a partial section of the set of threat change ratios associated with the group of the development code sets.

At operation 328, the server 130 determines whether the threat change pattern of the set of threat change ratios 168 corresponds to or matches one or more threat change patterns of the threat change ratios. In one embodiment, the server 130 may determine that a set of threat change ratios includes a set of consecutive values which are bigger than a change ratio threshold 169 for a first predetermined number ($N_1$) of times in the time sequence. For example, the change ratio may be bigger than a value for the consecutive number (K) of times.

In one embodiment, the server 130 may determine that the set of threat change ratios includes a set of values which are bigger than the change ratio threshold 169 for a second predetermined number L of times within the latest third predetermined number ($N_3$) of the development code sets in a time sequence. In one embodiment, the server 130 may determine that the set of threat change ratios includes a value bigger than a fourth predetermined number ($N_4$).

At operation 330, in response to determining that the set of the threat change ratios corresponds to the one or more threat change patterns of the threat change ratios, the server 130 dynamically triggers and executes the development security model 152 for the application j to further analyze and detect corresponding threat objects. The server 130 may determine threat objects and the number of detected threat objects in the development code sets. In one embodiment, the server 130 may generate a threat object report about the threat objects detected in the corresponding development code sets while the application product is running. The detected threat objects in the corresponding development code sets may be remediated while the corresponding development code set is running and analyzed by the run-time security model. The server 130 may continuously update the development code sets for continuous analyzing and evaluating the application product in the CI/CD pipeline process.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   a memory storing:
      a plurality of security models, each security model being configured to implement a corresponding security analysis associated with an application; and
      a group of development code sets associated with the application and generated in a time sequence; and
   a processor operably coupled to the memory, the processor configured to:
      execute a static security model to analyze each of the development code sets, of the group of the development code sets, to detect a number of corresponding threat objects in each of the development code sets;
      determine whether the number of the corresponding threat objects detected in each of the development code sets is lower than a corresponding static threat threshold;
      in response to determining that the number of the corresponding threat objects in each of the group of the development code sets is lower than the corresponding static threat threshold, combine the group of the development code sets, to generate combined development code sets, to run the application;
      in response to running the application, execute a run-time security model to analyze the combined development code sets to determine a set of threat object measurements and a set of false positive measurements for a plurality of application product releases for the application, wherein each of the threat object measurements represents a number of threat objects detected in each of the application product releases for the application, and wherein each of the false positive measurements represents a number of false positive threat objects detected in a corresponding application product release;
      for each of the application product releases, determine a set of threat threshold ratios between a run-time threat threshold and a highest value of a set of run-time threat thresholds;
      for each of the application product releases, determine a set of false positive ratios between each of the false positive measurements and a highest value of the set of the false positive measurements;
      generate an array of quartile weights corresponding to a set of quartile ranges of the threat threshold ratios and a set of quartile ranges of the false positive ratios associated with the application;
      generate a first adjusted threat object measurement of the application product releases for the application based on a corresponding quartile weight of the application in the array;
      and determine, based on the first adjusted threat object measurement-, whether to trigger a development security model for the application.

2. The system of claim 1, wherein the processor is further configured to:
   rank the set of the threat threshold ratios to generate the set of quartile ranges of the threat threshold ratios;
   and
   rank the set of false positive ratios to generate the set of the quartile ranges of the false positive ratios.

3. The system of claim 2, wherein the processor is further configured to:
  group multiple applications based on the set of the quartile ranges of the threat threshold ratios and the set of quartile ranges of the false positive ratios;
  determine a particular corresponding quartile weight in the array of the quartile weights corresponding to a quartile range of the threat threshold ratios and a quartile range of the false positive ratios;
  generate the adjusted threat object measurement by multiplying the corresponding quartile weight with a cumulative sum of corresponding threat object measurements for corresponding application product releases for the application; and
  determine whether the first adjusted threat object measurement for the application is above a development threat threshold associated with the development security model.

4. The system of claim 3, wherein the processor is further configured to, in response to determining that the first adjusted threat object measurement is above the development threat threshold for the application:
  dynamically trigger the development security model for the application.

5. The system of claim 1, wherein the processor is further configured to, in response to the running of the application and the execution of the run-time security model:
  analyze the combined development code sets to detect a number of development threat objects;
  determine whether the number of the development threat objects in the combined development code sets is lower than a run-time threat threshold;
  in response to determining that the number of the development threat objects in the combined development code sets is lower than the run-time threat threshold, deploy the combined development code sets into the application; and
  in response to determining that the number of the development threat objects is not lower than the run-time threat threshold, remediate the development threat objects and reevaluate a corresponding development code set by executing the static security model.

6. The system of claim 1, wherein the processor is further configured to, in response to determining that the number of the corresponding threat objects in a corresponding development code set is not lower than the static threat threshold, remediate the corresponding threat objects and reevaluate the corresponding development code set by executing the static security model.

7. The system of claim 1, wherein the static security model, the run-time security model and the development security model are distinct security models which are executed respectively to conduct a corresponding security analysis to detect corresponding development threat objects in a corresponding development code set associated with the application in a continuous integration and continuous delivery (CI/CD) pipeline.

8. A method comprising:
  executing a static security model to analyze each of a group of development code sets to detect a number of corresponding threat objects in each of the development code sets;
  determining whether the number of the threat objects detected in each development code set is lower than a corresponding static threat threshold;
  in response to determining that the number of the corresponding threat objects in each of the group of the development code sets is lower than the corresponding static threat threshold, combining the group of the development code sets, to generate combined development code sets, to run an application;
  in response to running the application, executing a run-time security model to analyze the combined development code sets to determine a set of threat object measurements and a set of false positive measurements for a plurality of application product releases for the application, wherein each of the threat object measurements represents a number of threat objects detected in each of the application product releases for the application, and wherein each of the false positive measurements represents a number of false positive threat objects detected in a corresponding application product release;
  for each of the application product releases, determining a set of threat threshold ratios between a run-time threat threshold and a highest value of a set of run-time threat thresholds;
  for each of the application product releases, determining a set of false positive ratios between each of the false positive measurements and a highest value of the set of the false positive measurements;
  generating an array of quartile weights corresponding to a set of quartile ranges of the threat threshold ratios and a set of quartile ranges of the false positive ratios associated with the application;
  generating a first adjusted threat object measurement of the application product releases for the application based on a corresponding quartile weight of the application in the array; and
  determining, based on the first adjusted threat object measurement, whether to trigger a development security model for the application.

9. The method of claim 8, further comprising:
ranking the set of the threat threshold ratios to generate the set of the quartile ranges of the threat threshold ratios; and
ranking the set of false positive ratios to generate the set of the quartile ranges of the false positive ratios.

10. The method of claim 9, further comprising:
  grouping multiple applications based on the set of the quartile ranges of the threat threshold ratios and the set of quartile ranges of the false positive ratios;
  determining a particular corresponding quartile weight in the array of the quartile weights corresponding to a quartile range of the threat threshold ratios and a quartile range of the false positive ratios;
  generating the adjusted threat object measurement by multiplying the corresponding quartile weight with a cumulative sum of corresponding threat object measurements for corresponding application product releases; and
  determining whether the first adjusted threat object measurement for the application is above a development threat threshold associated with the development security model.

11. The method of claim 10, further comprising, in response to determining that the first adjusted threat object measurement is above the development threat threshold for the application:
  dynamically triggering the development security model for the application to analyze a corresponding development code set.

12. The method of claim 8, further comprising:
in response to the running of the application and by the executing of the run-time security model, analyzing the combined group of the development code sets to detect a number of development threat objects;
determining whether the number of the development threat objects in the combined development code sets is lower than a run-time threat threshold;
in response to determining that the number of the development threat objects in the combined development code sets is lower than the run-time threat threshold, deploying the combined development code sets into the application; and
in response to determining that the number of the development threat objects in the combined development code sets is not lower than the run-time threat threshold, remediating the development threat objects and reevaluating a corresponding development code set by executing the static security model.

13. The method of claim 8, further comprising:
in response to determining that the number of the corresponding threat objects in a corresponding development code set is not lower than the corresponding static threat threshold, remediating the corresponding threat objects and reevaluating the corresponding development code set by executing the static security model.

14. The method of claim 8, wherein the static security model, the run-time security model and the development security model are distinct security models which are executed respectively to conduct a corresponding security analysis to detect corresponding development threat objects in a corresponding development code set associated with the application in a continuous integration and continuous delivery (CI/CD) pipeline.

15. A non-transitory computer-readable medium that stores instructions that when executed by a processor, causes the processor to:
execute a static security model to analyze each of a group of development code sets to detect a number of corresponding threat objects in each of the development code sets;
determine whether the number of the threat objects detected in each development code set is lower than a corresponding static threat threshold;
in response to determining that the number of the corresponding threat objects in each of the group of the development code sets is lower than the corresponding static threat threshold, combine the group of the development code sets, to generate combined development code sets, to run an application;
in response to running the application, execute a run-time security model to analyze the combined development code sets to determine a set of threat object measurements and a set of false positive measurements for a plurality of application product releases for the application, wherein each of the threat object measurements represents a number of threat objects detected in each application product release for the application, and wherein each of the false positive measurements represents a number of false positive threat objects detected in a corresponding application product release;
for each of the application product releases, determine a set of threat threshold ratios between a run-time threat threshold and a highest value of a set of run-time threat thresholds;
for each of the application product releases, determine a set of false positive ratios between each of the false positive measurements and a highest value of the set of the false positive measurements;
generate an array of quartile weights corresponding to a set of quartile ranges of the threat threshold ratios and a set of quartile ranges of the false positive ratios associated with the application;
generate a first adjusted threat object measurement of the application product releases for the application based on a corresponding quartile weight of the application in the array; and
determine, based on the first adjusted threat object measurement, whether to trigger a development security model.

16. The non-transitory computer-readable medium of claim 15, wherein the instructions when executed by the processor further cause the processor to:
rank the set of the threat threshold ratios to generate the set of the quartile ranges of the threat threshold ratios; and
rank the set of false positive ratios to generate the set of the quartile ranges of the false positive ratios.

17. The non-transitory computer-readable medium of claim 16, wherein the instructions when executed by the processor further cause the processor to:
group multiple applications based on the set of the quartile ranges of the threat threshold ratios and the set of quartile ranges of the false positive ratios;
determine a particular corresponding quartile weight in the array of the quartile weights corresponding to a quartile range of the threat threshold ratios and a quartile range of the false positive ratios;
generate the adjusted threat object measurement by multiplying the corresponding quartile weight with a cumulative sum of corresponding threat object measurements for corresponding application product releases for the application; and
determine whether the first adjusted threat object measurement for the application is above a development threat threshold associated with the development security model.

18. The non-transitory computer-readable medium of claim 17, wherein the instructions when executed by the processor further cause the processor to:
dynamically trigger the development security model for the application in response to determining that the first adjusted threat object measurement for the application is above the development threat threshold.

19. The non-transitory computer-readable medium of claim 15, wherein the instructions when executed by the processor further cause the processor to:
analyze the combined development code sets to detect a number of development threat objects;
determine whether the number of the development threat objects in the combined development code sets is lower than a run-time threat threshold;
in response to determining that the number of the development threat objects in the combined development code sets is lower than the run-time threat threshold, deploy the combined development code sets into the application; and
in response to determining that the number of the development threat objects is not lower than the run-time threat threshold, remediate the development threat objects and reevaluate a corresponding development code set by executing the static security model.

20. The non-transitory computer-readable medium of claim 15, wherein the instructions when executed by the processor further cause the processor to:

in response to determining that the number of the corresponding threat objects is not lower than the corresponding static threat threshold, remediate the corresponding threat objects and reevaluate a corresponding development code set by executing the static security model, and wherein the static security model, the run-time security model and the development security model are distinct security models which are executed respectively to conduct a corresponding security analysis to detect corresponding development threat objects in a corresponding development code set associated with the application in a continuous integration and continuous delivery (CI/CD) pipeline.

\* \* \* \* \*